Dec. 20, 1966    J. PREMACK    3,293,631
DETECTION APPARATUS

Original Filed Dec. 3, 1962    7 Sheets-Sheet 1

INVENTOR.
JOSHUA PREMACK
BY Omund R. Dahle
ATTORNEY

Dec. 20, 1966   J. PREMACK   3,293,631
DETECTION APPARATUS
Original Filed Dec. 3, 1962   7 Sheets-Sheet 2

INVENTOR.
JOSHUA PREMACK
BY Osmund R. Dahl
ATTORNEY

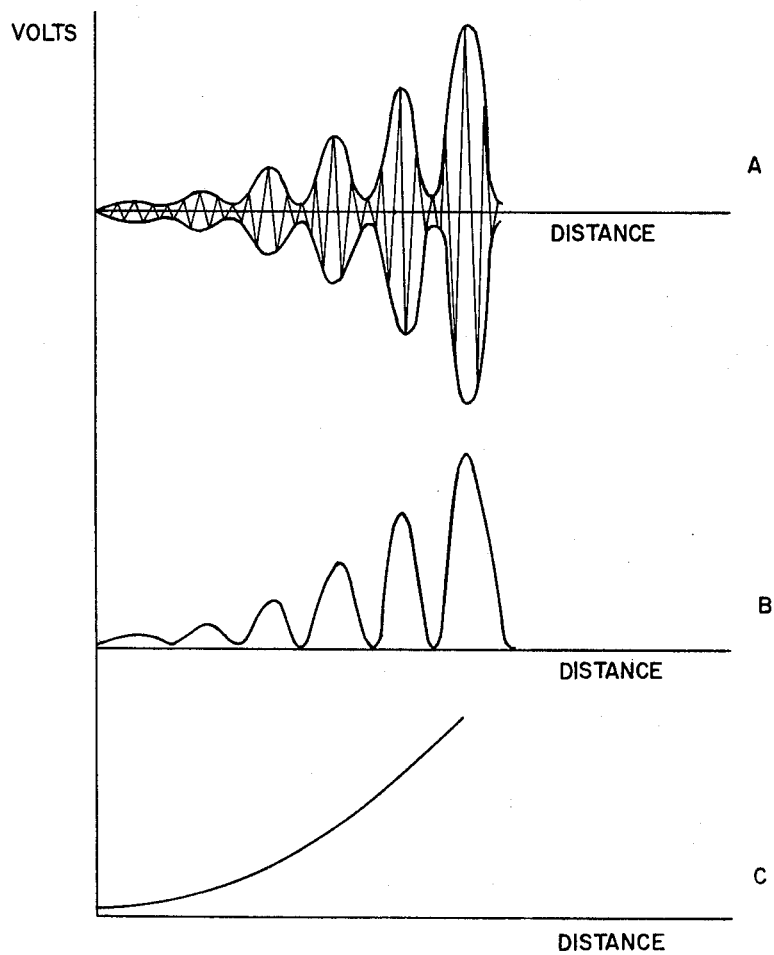

INVENTOR.
JOSHUA PREMACK
BY Osmund R. Dahle
ATTORNEY 3,293,631
DETECTION APPARATUS
Joshua Premack, Minneapolis, Minn., assignor to Honeywell Inc., a corporation of Delaware
Original application Dec. 3, 1962, Ser. No. 241,806, now Patent No. 3,222,664, dated Dec. 7, 1965. Divided and this application May 25, 1965, Ser. No. 469,961
7 Claims. (Cl. 340—258)

This application is a division of my application Serial No. 241,806, filed December 3, 1962, for "Detection Apparatus," now Patent No. 3,222,664, Serial No. 241,806, being a continuation-in-part of my application Serial No. 186,291, filed March 28, 1962 and entitled, "Detection Apparatus," now abandoned, which is itself a continuation in part of my application Serial No. 863,344, filed December 31, 1959 and entitled "Detection Apparatus," now abandoned.

The present invention relates generally to electronic apparatus, and more specifically to condition responsive apparatus which may be used to produce an indication whenever there occurs a change in some external condition from a predetermined quiescent state.

There are many applications for apparatus of the type described. For example, in intrusion detection systems, metal locating devices, etc., a need exists for apparatus which is responsive to the presence of an external condition and which produces an indication of a change from a normal state. Since there has been this need, many schemes have been devised for performing this function. In order to limit the discussion of the prior art, this specification will deal primarily with circuitry for use in electronic intrusion detection apparatus, but it is not intended nor should it be inferred that the apparatus of this invention is limited solely to this particular application.

A typical example of one form of a prior art electronic intrusion detection system is the type wherein the space to be protected is filled with supersonic vibrations, and means, based on the Doppler principle, are used to detect a disturbance of these vibrations. In the Doppler system, the motion of an intruder in the protected space produces a frequency shift in the sound waves. This frequency shift may be sensed by suitable heterodyne frequency detecting apparatus. Systems of this type generally do not provide entirely satisfactory performance in some situations in that they are highly subject to giving false alarms. Many factors, other than an intruder, may cause the apparatus to give an erroneous indication. For example, a sudden change in temperature, such as caused by the operation of the building's heating system, may be sufficient to produce a measureable Doppler frequency shift and trigger the alarm. Also, this type of apparatus is generally unsuitable for outdoor security systems due to the fact that the motions, which, for example, may be produced by a breeze in the effective range of the equipment, may cause a false alarm.

Another scheme that has been devised uses a pair of oscillators, the first being set and maintained at a predetermined constant reference frequency and the second being normally tuned to provide a zero beat frequency signal at the output of a mixing circuit employed therein. A capacity sensitive element is then connected to the tank circuit of the second oscillator only, such that the presence of an intruder causes the frequency of the second oscillator to change, thereby producing a beat frequency component at the output of the mixer. The chief disadvantage of this second system is that false alarms may result due to the fact that the oscillators used therein are subject to frequency drift caused by aging of the components used or by variations in the supply voltage.

The present invention provides an electronic circuit, suitable for use in intrusion detection systems as well as in other condition responsive systems, which is free from many of the faults found in the prior art systems described briefly above.

In one form of my invention I employ a pair of oscillators which are set to produce signals of substantially the same frequency, and which are normally in preset phase relation with one another. Means are also provided for coupling the frequency determining portions, or tank circuits, of the two oscillators together either directly or indirectly. The result is that when a condition exists tending to alter the frequency of said oscillator or the degree of coupling between them, they remain locked or held in frequency synchronism by the coupling means. In addition, means are included for deriving signals proportional to the phase shift between the output signals from the oscillators which occurs when the oscillators attempt to shift in frequency with respect to one another due to the introduction of a condition which affects the degree of coupling between the two oscillators or the L-C values of the tank circuits of said oscillators. The system also includes a detector circuit sensitive to the rate of change of the signals applied thereto which may be used to amplify these signals to a level whereby they can be used to actuate a relay or other suitable indicating devices.

Since the two oscillators are held in synchronism by the coupling means and since the oscillators are nearly identical, the circuit is quite insensitive to oscillator drift. Also, since it is possible to use a variety of components as coupling means, the same circuit may easily be modified to operate properly either indoors or outdoors.

It has been proposed in the electronic modulator art to provide an inductive coupling path between two oscillators in order to maintain the oscillator produced thereby in synchronism, and then to modulate these oscillations by using a capacity or electrostatic type microphone to vary the capacity in the tank circuit on one of these oscillators. In attempting to establish a difference in frequencies between the two oscillators, there is developed in the coupling path a high frequency signal modulated at an audible rate. Heretofore, to my knowledge, no one has thought of carrying over a related idea to the condition responsive system art so as to obtain a highly sensitive, yet extremely stable device. Likewise, no one has, as far as is known, provided a means whereby the detection device employed may be separated from the means used to couple the oscillator in synchronism, to thereby provide a circuit with the versatility in the present invention.

It is accordingly an object of the present invention to provide an improved electronic circuit suitable for use in condition responsive apparatus.

Another object of this invention is to provide means whereby the same apparatus may be used in many applications to provide an indication of the change in some external condition by merely substituting various transducers in the coupling circuit used in said apparatus.

Still another object of this invention is to provide an improved condition responsive system which is highly stable and extremely sensitive to changes in the surrounding environment.

Yet still another object of the present invention is to provide in a condition responsive system, a pair of oscillators which are locked in frequency synchronism by suitable coupling means, and which produce a detectable output when there is a change in an external condition tending to vary the coupling between said oscillators.

A still further object of this invention is to provide in a condition responsive system a pair of oscillators, the frequency determining portions of which are coupled together to maintain frequency synchronization between the two oscillators, and in which a usable output from said circuit is obtained at a point separate from the means used to intercouple said oscillators.

When more than one detection system is in operation, that is, systems operating in adjacent areas, there may be enough exchange of energy between the systems to cause false alarms. By operating all the systems at exactly the same frequency, these false alarms caused by the multiple systems may be eliminated. In my invention I have disclosed ways of accomplishing this end, one way is in changing one of the oscillators in each system to an amplifier and synchronize these modified oscillators by a signal from a master oscillator. Another way is to provide a master oscillator and power amplifier to supply a master line and master loudspeakers at each system location. Changes in the acoustic coupling or standing wave pattern affect only the relative phase of the remaining oscillator of each system with respect to the master. The phase of the master line is affected little or nothing while the other oscillator is free to vary its phase with changes in energy transfer.

Another object of this invention therefore is to provide an improved condition responsive system in which multiple adjacently located systems may be satisfactorily operated simultaneously.

Other objects and advantages of the invention will become apparent after reading the attached detailed description and upon reference to the drawings in which:

FIGURE 1a is a modification of the embodiment shown in FIGURE 1 in which a photoconductive cell is employed.

FIGURE 1b shows a search coil which can be used for adapting the circuit of FIGURE 1 to a metal detecting system.

FIGURE 1c illustrates how the circuit of FIGURE 1 can be utilized in a fence supervisory system.

Figure 1:
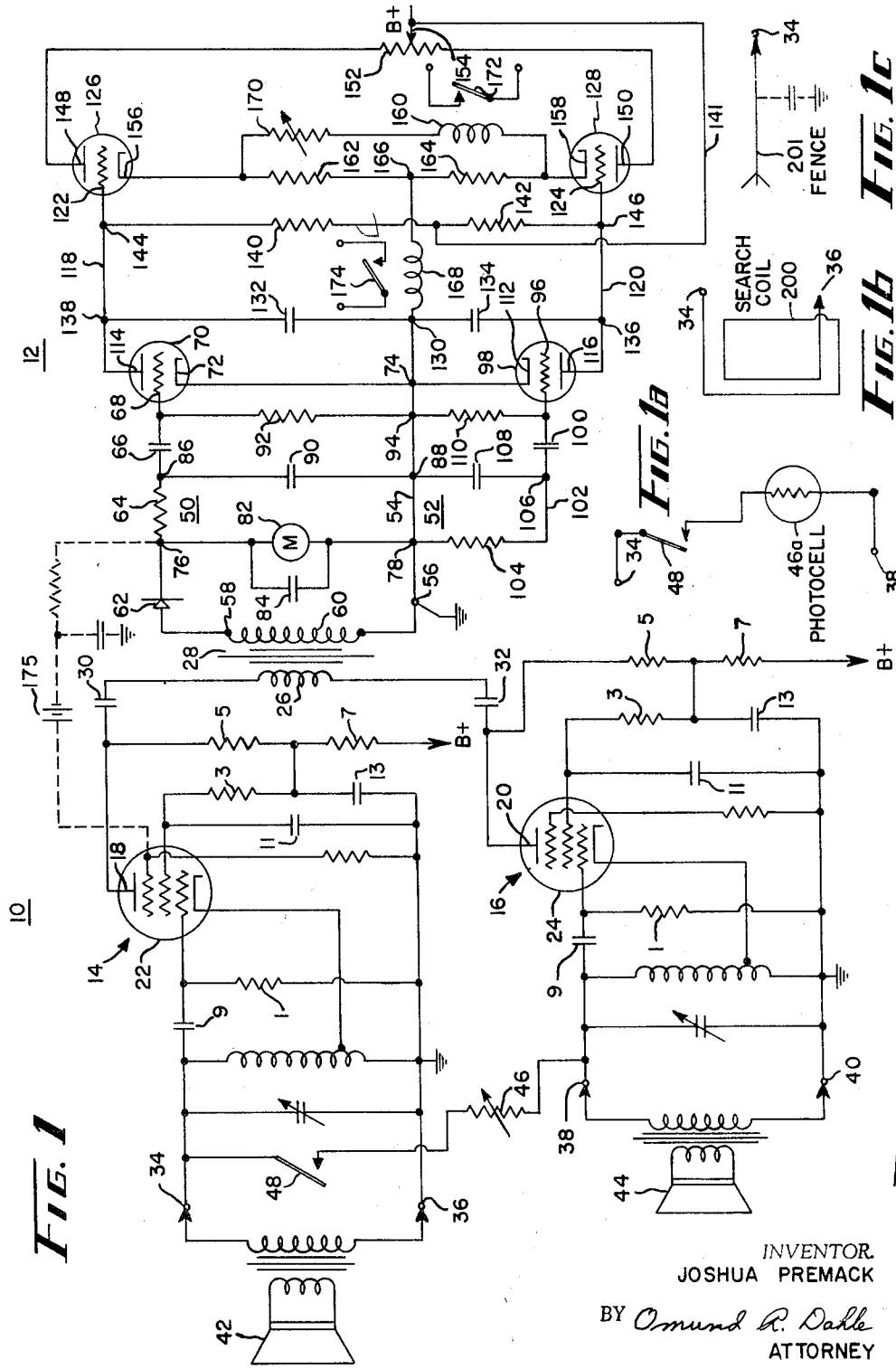
FIGURE 1 is a schematic diagram of one embodiment of the present invention as applied to an intruder detection system.
Figure 2:
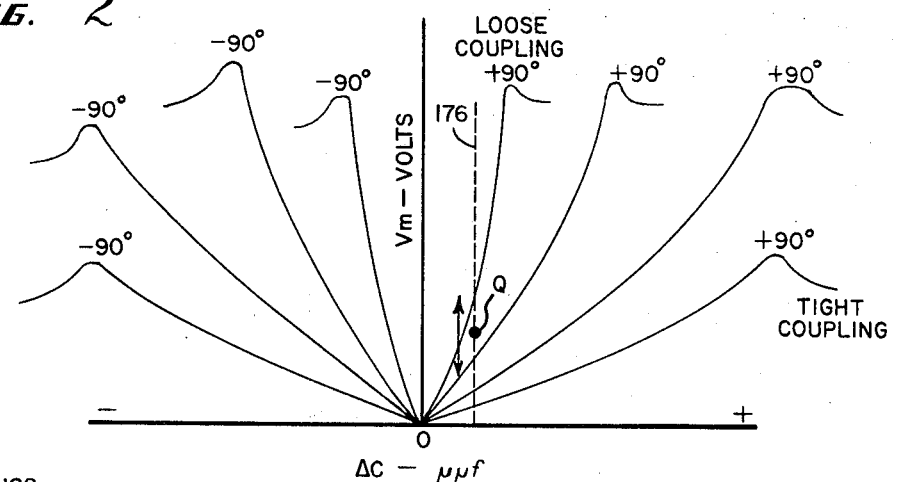
Figure 5:
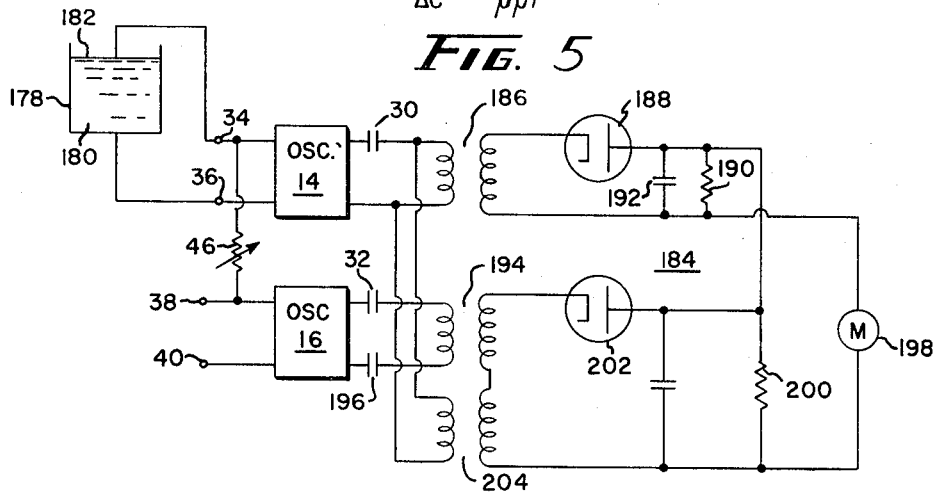
Figure 3:
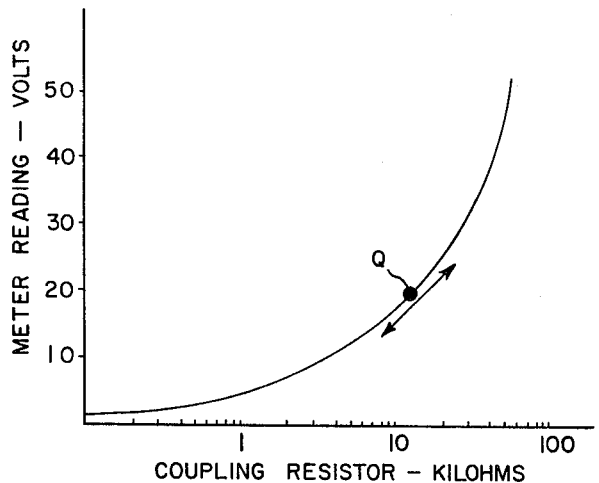
Figure 6:
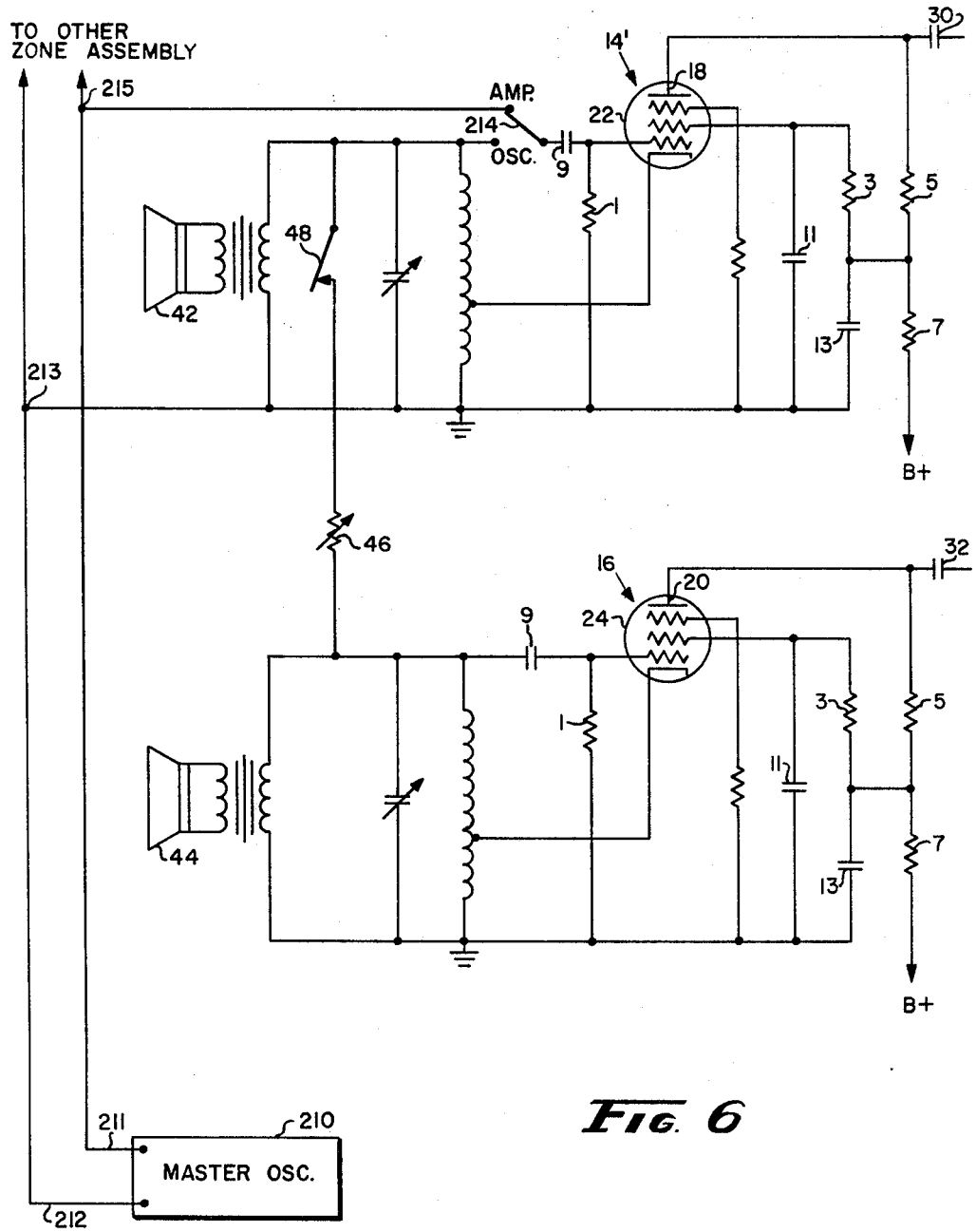
Figure 7:
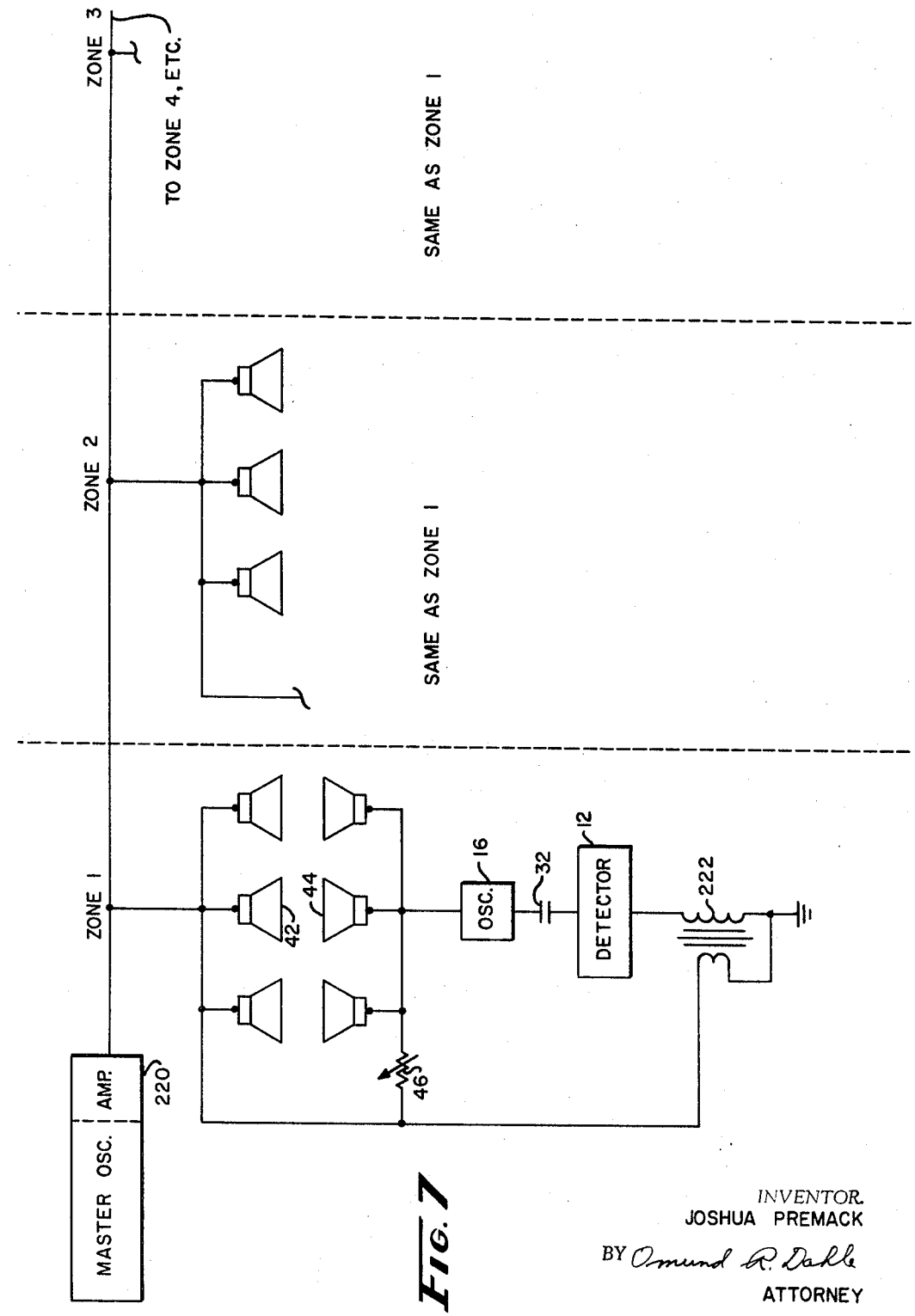
Figure 8:
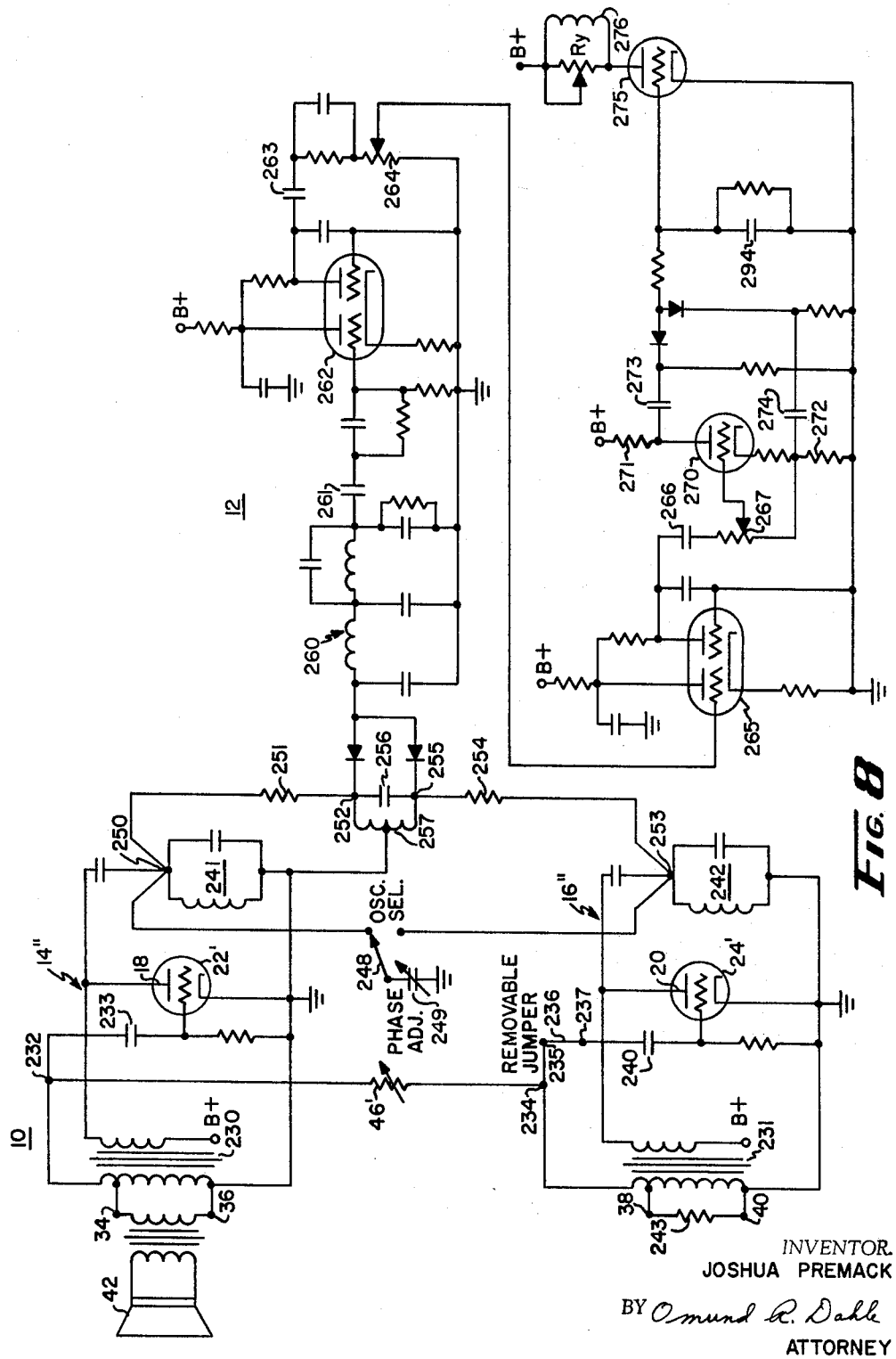
Figure 9:
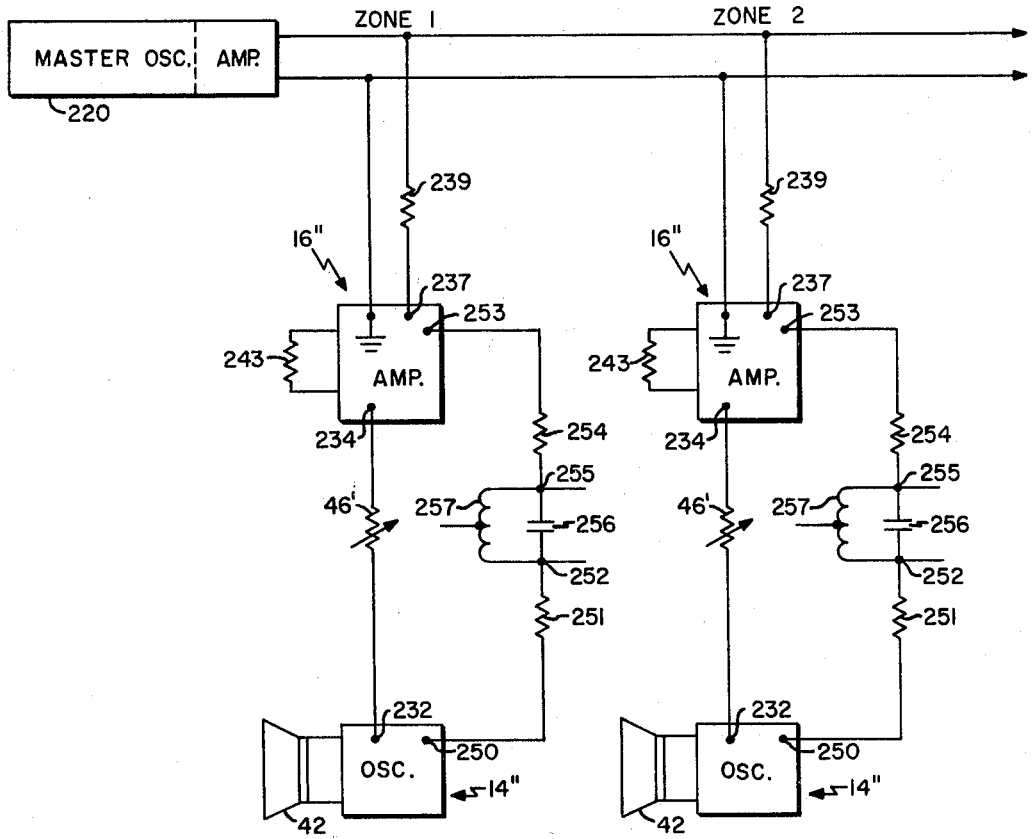
Figure 10:
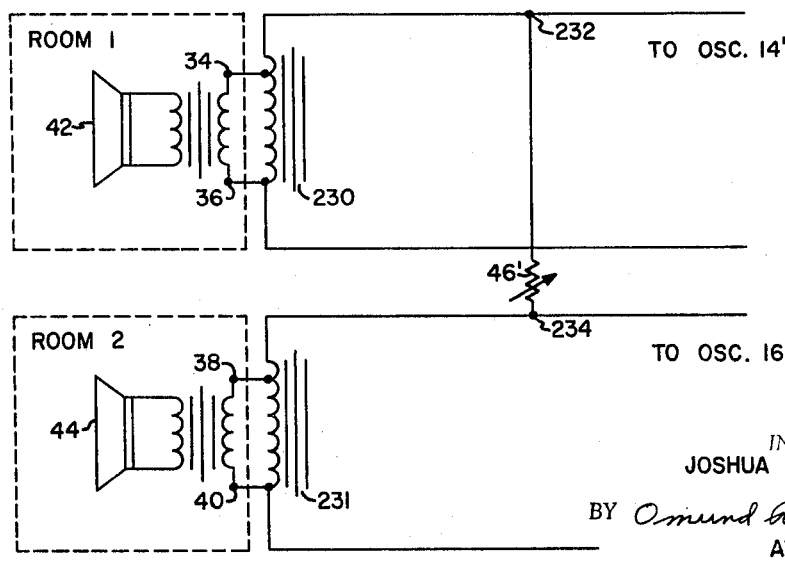

FIGURE 2 is a family of curves showing the variation of the oscillator circuit output voltage with changes in the tank circuit capacity of one of the oscillators for various degrees of coupling resistance, FIGURE 3 is a curve showing a variation of the output voltage from the oscillator portion of the circuit of FIGURE 1 with changes in the degree of coupling between the two oscillator circuits when said oscillators are not in perfect synchronism, FIGURE 4 shows graphs A, B, and C which illustrate various waveforms observed in the detector circuit of the embodiment of FIGURE 1, FIGURE 5 illustrates the manner in which the coupled oscillator arrangement of this invention may be applied to a telemetering system, FIGURES 6 and 7 illustrate several arrangements in which more than one system is operated in a given area, FIGURE 8 illustrates a preferred embodiment of the invention in which the speaker is used on one oscillator in each zone to be protected; and, FIGURES 9 and 10 are modifications of the preferred embodiment of FIGURE 8.

While the invention has been described in connection with several embodiments, it will be understood that I do not intend to be limited to the embodiments shown, but intend to cover all alternative and equivalent constructions falling within the spirit and scope of the appended claims.

Turning now to the drawings, there is shown in FIGURE 1 a circuit diagram of the invention which may, for ease in presentation, be divided into two sections. The section indicated generally by the numeral 10 may be referred to as the oscillator portion of the circuit, whereas the section indicated generally by the numeral 12 may be considered as the detection device. The oscillator section of the circuit is shown as including a pair of oscillators 14 and 16. Oscillators 14 and 16 are preferably of the electron coupled variety, but limitation to this particular oscillator arrangement is not intended.

The output signals from the oscillators 14 and 16 are obtained at the plate electrodes 18 and 20 of the oscillator tubes 22 and 24 respectively. The load, which in the embodiment of FIGURE 1 is the primary winding 26 of an output transformer 28, is coupled in series with the plate electrodes 18 and 20 through coupling capacitors 30 and 32. The oscillators 14 and 16 are also provided with a pair of terminals 34–36 and 38–40, respectively, which are adapted to be connected to suitable transducer means. The particular transducers used with the circuit of FIGURE 1 is dependent on the particular application for which the circuit is to be used. As mentioned previously, the circuit of this invention is described primarily in connection with its use in an intruder detection system and, as such, transducers suitable for this application may be transmitting-receiving type loudspeakers 42 and 44. When oscillators 14 and 16 are each oscillating, energy is radiated from loudspeaker 42 and received by loudspeaker 44 and vice versa. In addition to the radiation coupling between the two oscillator circuits as provided by the loudspeakers, it may be desirable to provide a certain degree of fixed coupling between them. For this reason a variable resistor 46 is connected through a switch 48 between the terminals 34 and 38.

The detector circuit 12 of FIGURE 1 may be considered as being comprised of an active channel 50 and a compensating channel 52. The channels 50 and 52 are provided with a common connection through the conductor 54 which is maintained at ground or some other fixed potential at point 56. The purpose of providing somewhat duplicate channels in the detector circuit 12 is to eliminate any effects which may be caused by variation in the plate supply potentials or other extraneous noise signals. The input to the active channel 50 is applied between terminals 56 and 58 to which secondary winding 60 of the output transformer 28 is connected. The input terminal 58 to the detector circuit is connected through a diode 62, a resistor 64, and a capacitor 66 to the control grid 68 of an amplifying device 70. The cathode electrode 72 of amplifying device 70 is connected to conductor 54 at junction 74, and hence, is maintained at ground potential. Connected between junction 76 on conductor 62 and junction 78 on conductor 54 is an indicator or meter 82 which may be included to provide a means for monitoring the operation of the oscillator section 10. A condenser 84 is connected directly in parallel with the meter 82 to provide a filter for the oscillator output signals. Connected between the common junction 86, i.e., between resistor 64 and capacitor 66, and junction 88 on grounded conductor 54 is a capacitor 90. A resistor 92 is included in the circuit between junction 94 on grounded conductor 54 and the control electrode 68 of the amplifying device 70.

In a quite similar arrangement, the control electrode 96 of amplifying device 98 in the compensating channel 52 is connected through a capacitor 100, a conductor 102 and a resistor 104 to the grounded junction 78. Connected directly in parallel with resistor 104 between grounded junction 88 and junction 106 on conductor 102 is a capacitor 108. The control electrode 96 is also connected to the grounded conductor 54 through a resistor 110. The cathode electrode of amplifying device 98 is connected directly to ground at the junction 74.

The resistor 64 and the capacitor 90 work together, as do the resistor 104 and the capacitor 108, to provide low pass filtering of the signals applied thereto. Likewise, the capacitor 66 works with the resistor 92 to impress slowly varying signals on the control grid 68.

Plate electrodes 112 and 114 of amplifying devices 70 and 98, respectively, are connected through conductors 118 and 120 to the control electrodes 122 and 124 of the cathode follower amplifiers 126 and 128. Connected between the junction 138 on conductor 118 and the junction 130 on the grounded conductor 54 is a capacitor 132. Similarly, the capacitor 134 is connected between junction 130 and junction 136 on conductor 120 in the dummy channel 52. These capacitors perform the function of providing an additional bypass path for undesired alternating signals which may possibly be present at plate electrodes 112 and 114.

The plate supply potential for the amplifying tubes 70 and 98 is supplied through a conductor 141 and the plate load resistors 140 and 142, which are connected to the conductors 118 and 120 at junctions 144 and 146, respectively. The plate electrodes 148 and 150 of the cathode follower amplifier stages 126 and 128 are connected to opposite ends of a potentiometer 152, the wiper arm 154 of which is connected to the positive terminal of source of B+ voltage. By varying the position of the wiper 154 with respect to the potentiometer windings it is possible to initially balance the cathode follower circuits such that the potential difference existing between the cathode electrodes 156 and 158 on tubes 126 and 128, respectively, is zero. Under this condition, no current flows through the indicator relay winding 160.

The cathode load resistors 162 and 164 are connected together at a junction 166 which, in turn, is connected through a fail safe relay winding 168 to the grounded junction 130. Whenever there is a potential developed across the cathode load resistor 162 that is different from the potential developed across the cathode resistor 164, a current flows through the variable resistor 170 and the indicator relay coil 160, which may be of sufficient magnitude to cause the relay contacts 172 associated with relay coil 160 to close. By varying the magnitude of resistor 170, the magnitude of the voltage difference developed across resistors 162 and 164 required to close the contacts 172 may be adjusted.

Now that the circuit connections have been described in detail, this specification will continue with a description of a circuit operation.

OPERATION

As is well known in the art, in the electron coupled oscillator arrangement the cathode, control grid, and screen grid may form the conventional electrodes of a Hartley type triode oscillator in which the screen serves as the anode or plate. The electrons that are intercepted by the screen represent the oscillator anode current that produces the oscillations. The remaining electrons, which represent most of the space current, pass through the screen and go on to the plate, where they produce output power by flowing through the load impedance that is connected in series with the plate electrode. This plate current is controlled by the oscillator part of the tube. The load impedance has little effect on the frequency at which the circuit oscillates because the plate current of a pentode is relatively independent of the plate potential (and hence of the load impedance of the plate circuit) and the minimum plate potential is not so low as to allow the formation of a virtual cathode. Under these conditions the load impedance and the oscillator section of the tube are coupled only by the electron stream. In the oscillators used in FIGURE 1, the screen grid is bypassed to ground and serves as an electrostatic shield between the oscillator and the output section of the system, while the cathode is ungrounded. This arrangement has the advantage that the entire space current of the tube flows through the cathode-to-ground section of the oscillator resonant circuit, and is therefore available to aid in the generation of oscillations. Even though most of this space current also flows through the output load impedance, this fact does not cause the load to react on the oscillator section since the plate current of the system is substantially independent of impedance in the plate circuit as long as a virtual cathode is not formed within the tube. Since oscillators of this type are quite well known in the art, it is felt to be unnecessary to described in detail the circuit arrangement and basic operation in this specification.

Referring now to the oscillatory section 10 of the circuit of FIGURE 1, the virtually identical oscillators 14 and 16 are initially set to oscillate at substantially the same frequency. This adjustment can be made by varying the trimmer capacitors located in the tank circuits of these two oscillators. When these two circuits are oscillating, energy will be radiated from the transmitting-receiving loudspeaker 42 connected to the frequency determining portion of oscillator 14 at junctions 34 and 36, a portion of which will be received by transducer 44 coupled to the frequency determining portion of oscillator 16 at terminals 38 and 40. Likewise, energy will also be radiated from the transducer 44, a portion of which will be received by the loudspeaker transducer 42 on oscillator 14. The oscillator circuits 14 and 16 are, so to speak, cross-coupled by sonic energy such that the two oscillators tend to become locked in frequency synchronization. Also, the substantially square wave output signal obtained at the plate 18 of tube 22 is nearly in phase with the square wave signal obtained at the plate electrode 20 of tube 24 under normal balanced conditions. Since these two plate electrodes are coupled to opposite ends of the primary winding 26 of output transformer 28 through condensers 30 and 32, if the signals are equal in amplitude and exactly in phase there will be zero net voltage across winding 26 and hence the output obtained across the terminals 56 and 58 of secondary winding 60 will be zero.

In FIGURE 2 there is presented a family of curves which illustrates the manner in which the oscillator circuit output voltage (as observed by meter 82) varies with changes in the tank circuit capacity of one of the two oscillators, from a position of capacitance equality to some other greater or less value, for various values of fixed coupling as provided through the resistor 46 and switch 48. It can be seen that when the two oscillators have the same value of tank circuit capacity, such that the plate currents from the two oscillators are equal in magnitude and in phase, the voltage applied to the detector circuit is approximately zero. This may be defined as the perfect synchronization condition. When the coupling between the two oscillators is quite loose, i.e. resistor 46 has a relatively high ohmic value, a small change in the tank circuit capacity of one of the oscillators from the condition of perfect synchronization causes a relatively large change in the voltage applied to the detector circuit 12. However, when the two oscillators are tightly coupled, i.e. the ohmic value of resistor 46 is relatively low, this same change in capacity from the perfect synchronization condition causes only a very minor change in the voltage applied to the detector circuit 12.

It may also be noted that the curves are very nearly symmetrical with respect to the ordinate axis. In other words, either an increase or a decrease of the same amount in the tank circuit capacity of one of the two oscillators from the value corresponding to perfect synchronization causes the same output voltage.

When the coupling resistance 46 is set at some value and the tank circuit capacity of one oscillator is increased or decreased continuously from the perfect synchronization value, a point is reached where the two oscillators are no longer locked in frequency synchronization and the voltage output drops off abruptly. For all values of coupling resistance, this point corresponds to a phase shift between the two oscillator plate currents of either +90° or −90°.

In FIGURE 3 there is shown a curve which illustrates the manner in which the voltage (as observed by meter 82) varies in response to a unit change in the degree of coupling between the two transducers 42 and 44 for various values of fixed coupling. The fixed coupling referred to is that provided by means of the variable resistor 46 which may be inserted in the circuit between terminals 34 and 38 by closing switch 48. The curve of FIGURE 3 is obtained by first detuning the two oscillators from the perfect synchronization condition by varying the tank circuit capacity of one of the oscillators by a predetermined amount, and then, varying the magnitude of the coupling resistor 46 from a relatively low value to a relatively high value and recording the reading of the meter 82. In effect, what is done is to move the operating point Q of the circuit vertically upward on a line such as line 176 in FIGURE 2.

Since the resistor 46 controls the amount of energy transferred between the frequency determining portions of the two oscillators, for ease in understanding, a change in the energy transferred between the two loundspeakers may be considered as being equivalent to a change in the resistance coupling between the two oscillators. Although it appears that the manner in which energy is transferred between the two loudspeakers is much more involved than a mere change in an equivalent coupling resistance, for the purpose of explanation the change in energy coupling established between the two transducers may be thought of as a change in the equivalent resistance coupling.

From the curve it can be seen that when the value of a fixed coupling resistor is low, a unit change in the radiation coupling between the two loudspeakers causes only a slight change in the voltage appearing across the input terminals 56 and 58 of detector 12. When the ohmic value of resistor 46 is relatively high, however, this same unit change in radiation coupling produces a very substantial change in voltage as measured by meter 82.

From the curves of FIGURE 2 it may be observed that when the oscillators 14 and 16 are loosely coupled (the ohmic value of resistor 46 is relatively high or even open) a unit change in the radiation coupling is capable of producing a relatively large phase shift between the signals obtained at the plate electrodes of tubes 22 and 24 such that cancellation no longer occurs. It should be emphasized that this change in radiation coupling does not cause a net shift in the frequencies of the signals produced by oscillators 14 and 16. While the frequencies of both oscillators may both change somewhat, the radiation coupling as well as the coupling provided by the variable resistor 46 insures that the frequency of oscillator 14 will remain synchronized with that of oscillator 16 within certain limits. As mentioned previously, however, when the change in coupling exceeds these certain limits the two oscillators no longer remain synchronized but tend to beat against one another. More precisely, when the relative phase shift between the signals obtained at the plate electrodes 18 and 20 of oscillator tubes 22 and 24 exceeds ±90° the two oscillators no longer remain in frequency synchronization.

When operating as an intrusion detection device the trimmer capacitors in the tank circuits of the two oscillators 14 and 16 may be set to produce oscillations either in the audible range, say 400 cycles per second or in the inaudible range, say 25,000 cycles per second. If this latter frequency range is chosen, the intruder would perhaps be unaware that his presence is being monitored. In operation then, the resistor 46 is adjusted to provide a desired degree of coupling between the two oscillator circuits and the tank circuit capacity of one of the oscillators is detuned slightly. When an intruder enters the area being protected, his presence causes a change in the radiation coupling achieved through the use of the transmitter-receiver transducers, 42 and 44. This change in radiation coupling, in turn, causes a relative shift in phase between the substantially square wave signals obtained at the output of the two oscillators. As a result the signals no longer cancel in the primary winding 26 and a substantial signal is induced in secondary winding 60 of transformer 28. It has been determined experimentally that if the transducers 42 and 44 are properly placed in a room of approximately 1000 square feet, unamplified outputs of at least one volt are obtained upon the motion of an intruder anywhere in the room.

Graph A in FIGURE 4 illustrates, somewhat ideally, the wave-form of the voltage developed across the transformer secondary winding 60 when an intruder enters into an enclosed area being protected and walks toward the general location of the two transducers 42 and 44 at a constant rate. The relatively high frequency components, similar to a carrier in the amplitude modulation art, contained within the envelope having a somewhat lower frequency, are the voltage signals produced by the oscillator section 10. In walking toward two transducers an intruder affects the degree of coupling between the two oscillators to a greater and greater extent; hence the generally rising value of the peak voltage of the envelope. The peaks and nodes in this wave are due to the change in the standing wave pattern of the sound as his body passes through the sound field. The peaks and nodes occur at multiples of the half wave length of the sound wave and their frequency is dependent on the velocity of the sound in the surrounding medium, the rate of approach of the intruder, and the frequency of the sound sources. If the apparatus is used in outdoor applications, there would be no standing wave pattern, as such, so that the waveform of the signals developed across the secondary winding 60 does not evidence these peaks and nodes.

Diode 62, which is effectively connected in series with the secondary winding output terminal 58, causes a rectification of the signals applied thereto, and hence, the waveform of the voltage present across terminals 76 and 78 may be represented by that shown in FIGURE 4, Graph B. The capacitor 84 connected across the meter 82 effectively bypasses the high frequency carrier to ground, hence the absence of said carrier in the waveform of Graph B in FIGURE 4. When this voltage is applied to a low pass filter consisting of the combination of resistor 64 and capacitor 90 in the active channel 50 of detector circuit 12, the relatively high frequency components of the envelope are filtered out such that the voltage appearing at junction 86 may be represented by the waveform shown in Graph C in FIGURE 4. The capacitor 66 and resistor 92 are designed to have a relatively high RC time constant and hence the voltage appearing at junction 86 is effective to charge up condenser 66 and impress a voltage on the control grid 68 of tube 70.

When oscillators 14 and 16 are in their quiescent state and only an insignificant signal is being induced in secondary winding 60 of tranformer 28, voltage applied to control electrode 68 of tube 70 will be qeual to that applied to the control electrode 96 of tube 98. The voltages applied to the control electrodes 122 and 124 of the cathode follower output tubes 126 and 128 will be substantially equal, and hence, the potential difference developed across the cathode follower load resistor 162 will be equal to that developed across the cathode follower load resistor 164. As a result, little or no current flows through the path containing the variable resistor 170 and the indicator relay coil 160. Contacts 172 associated with relay coil 160, which lead to an external indicator, therefore remain open. A variation in the voltage applied to the control electrode 68 of tube 70 or to the control electrode 68 of tube 70 or to the control electrode 122 of cathode follower tube 126 caused by a variation in the B+ plate supply will also appear on the control electrode 96 of amplifier tube 98 and the control electrode 124 of the cathode follower tube 128. Since the cathode follower tubes 126 and 128 are connected in a differential manner, the variation in plate supply voltage will be ineffective to cause energization of the relay coil 160.

As mentioned previously, the approach of an intruder causes the voltage on capacitor 66 located in the active channel 50 to increase. Since the outputs from the two oscillators are coupled only to the active channel through the transformer 28, the approach of the intruder will not cause an equal voltage to be developed on the capacitor 100 in the compensating channel 52. As a result, there will be an unbalanced potential applied to the control electrodes 122 and 124. This causes the potential developed across cathode follower load resistor 162 to be different from that developed across the cathode follower load resistor 164. A circulating current is therefore able to flow through the variable resistor 170 and the indicator relay coil 160. The point at which the relay contacts 172 pull in to complete a suitable indicator circuit may be adjusted by means of a variable resistor 170 located in series with the relay coil 160.

The plate current normally flowing from the B— source, through each half of the potentiometer 152, from the plate to cathode electrode of the cathode follower tubes 126 and 128, through the cathode follower load resistors 162 and 164, and through the fail safe relay coil 168 to the grounded junction 130, maintains a relay coil 168 normally energized. In the event of a power failure, however, coil 168 is de-energized causing the contacts 174 associated therewith to close. The closure of these contacts may be used to complete an external indicator circuit so as to notify supervisory personnel of such a failure.

It is perhaps apparent that the indicator relay coil 160 or other suitable indicating device may be inserted directly in the oscillator circuit 10 in place of the output transformer primary winding 26 since the power available at this point is in most applications adequate to energize a relay. However, to improve the reliability of the system and to decrease the possibility of false alarms being given, the detector circuit arrangement 12 is felt to be desirable.

In some applications it is conceivable that the ambient noise level may be too high to permit the use of transmitter-receiver type loudspeaker transducers in an intruder detection system. For example, in a railroad terminal or an airfield installation, the background noise may be sufficiently high to prevent normal functioning of the apparatus. With this possible limitation in mind, it has proved to be desirable to utilize a pair of radio frequency antennae as the transducing elements in place of the loudspeakers to provide the desired radiation coupling. When this expedient is followed the two oscillators are set to oscillate at substantially the same frequency which may be, for instance, somewhere in the range of between 100 and 500 megacycles. The energy radiated by the antenna connected between the terminals 34 and 36 on oscillator 14 is received by the antenna connected between terminals 38 and 40 on oscillator 16, and similarly, the energy radiated from the antenna connected between terminals 38 and 40 is picked up or received by the antenna connected between terminals 34 and 36 on oscillator 14. The two oscillators are therefore effectively cross-coupled by means of the energy radiated by the two oscillators.

Again, a predetermined amount of fixed coupling may be introduced between oscillators 14 and 16 by inserting the variable resistor 46 between the tank circuits of the two oscillators. The magnitude of the coupling resistor 46, in effect, determines the operating point Q on the curve of FIGURES 2 and 3. As before, an increase or decrease in the energy transferred between the two antennae may be considered as being comparable to an increase or decrease in the amount of resistance coupling between the two oscillator circuits. Upon the ingress of an intruder into the effective range of the system, there will occur a change in the energy transferred between the two antennae. The result of this change in energy transferred is to cause a relative shift in the phase angle between the output signals of the two oscillators such that signal cancellation no longer obtains. In effect then, the operating point Q is shifted up or down along the curve causing a substantial change in the voltage developed across the secondary winding 16 of transformer 28. As was described previously, these signals are rectified, filtered, amplified, and applied to a control electrode 122 of the cathode follower tube 126. This of course causes the potential at the cathode electrode 156 of tube 126 to be different from the potential at the cathode electrode 158 of tube 128. As a result of this potential difference, a current flows through the indicator relay coil 160 causing its contacts to close.

The frequency of the two oscillators may be adjusted to produce signals having a wave length of the same order of magnitude as the dimensions of a human being such that the radiation coupling is affected to a greater extent by a man than by other bodies that may enter the effective range of the system.

One of the advantages of the condition responsive system of this invention is its extreme versatility. For example, the same circuitry may be used in a metal detecting system with only very minor modifications. These modifications lie chiefly in the type of transducer connected between the terminals 34–36 and 38–40. In adapting the circuit of this invention to a ferrous metal detection system, I employ as a search coil a plurality of turns of wire around a doorway through which persons possibly carrying metal objects must pass. The two ends of this search coil 200 are connected directly to the terminals 34 and 36 as in FIGURE 6 or in the alternative, the search coil may be substituted for the tank circuit inductance of oscillator 14. No electrical connection is made between the corresponding terminals 38 and 40 on oscillator 16. The two oscillators are then set to oscillate at about 300 cycles per second by properly adjusting the trimmer capacitors in the frequency determining portions of said oscillators. Switch 48 is closed next and resistor 46 varied to provide a desired degree of coupling between the two oscillators. With this coupling path established, the two oscillators 14 and 16 tend to lock together in frequency synchronization. Now, when a person carrying a metal object passes through the doorway surrounded by the search coil, the inductance of said coil tends to increase, thereby tending to decrease the frequency of oscillator 14 with respect to oscillator 16. The reason that the inductance of the coil increases is that the reluctance of the magnetic circuit is decreased upon the entry of a ferrous metal into the neighborhood.

However, because of the manner in which the two oscillators are coupled, the result of this attempted frequency shift is to cause a relative change in the phase angle between the signals produced at the oscillator plate electrodes 18 and 20. This change in phase angle from the normal phase condition results in an increase in the voltage applied to the primary winding 26 through coupling capacitors 30 and 32. As was discussed in connection with the operation of the circuit in an intrusion detection system, this change in voltage across primary winding 26 results in an unbalance in the signals applied to the control electrodes 68 and 96 of the amplifying tubes 70 and 98 located in the active channel 50 and the compensating channel 52, respectively. This unbalance in potential is again effective to cause a difference in the potential developed across cathode follower load resistors 162 and 164 which results in an increase in the current flowing through the indicator relay coil 160 sufficient to cause its contacts to close.

It is also possible to operate the metal detector so as to detect the presence of non-ferrous metals by operating the oscillators at a higher frequency (5–10 kc.) and making use of the shorted turn effect produced by eddy currents to lower the inductance of the search coil.

In addition to its freedom from the effects of oscillator drift, the circuit of this invention has another advantage over prior art condition responsive systems utilizing the heterodyne principle for developing signals indicative of a change in some external condition. In a heterodyne system where capacity changes are used to produce a beat frequency signal to activate an alarm circuit, it is found that sensitivity of such a system depends on the size of the area to be protected as well as the magnitude of the change in capacity resulting from the ingress of an intruder. For example, if the two oscillators used in such a system are set to produce a zero beat frequency signal when oscillating 100 kilocycles, and the capacity to ground of the fence surrounding the area is 1000 micro-microfarads (which corresponds to approximately 250 feet of fence), a change in capacity of 1 micro-microfarad causes a frequency shift of approximately 50 cycles per second. However, if it is desired to protect 500 feet of fence, which has a capacity to ground of approximately 2000 micro-microfarads, the same change in capacity of 1 micro-microfarad now causes a frequency shift of only 25 cycles per second. Since the output from the detector circuit commonly used in heterodyne systems is generally proportional to the degree of frequency shift, it can be seen that the sensitivity of such a system is dependent on the length of the fence to be supervised.

In a fence supervisory system utilizing the circuit of the present invention however, the magnitude of the output signal is independent of the fence length to be protected. In adapting the circuit of my invention to a fence supervisory system, one wire 201 of the fence to be protected is connected to one oscillator input terminal only such as terminal 34 as in FIGURE 1c. A change in the capacity to ground produced by the approach of an intruder effects the resonant frequency of the tank circuit associated with oscillator 14. When used in a capacity type intruder detection system, the terminals 38 and 40 of oscillator 16 are open circuited. The trimmer capacitors in the tank circuits of oscillators 14 and 16 are again adjusted so that the frequency of the oscillations produced by oscillators 14 and 16 are approximately equal. When switch 48 is closed, a predetermined amount of fixed coupling is established between the frequency determining portions of oscillators 14 and 16 such that the two oscillators tend to become locked in frequency synchronization. Now, when an intruder approaches the fence and enters within approximately three feet thereof, there results an increase in the capacity in the tank circuit of oscillator 14 such that it tends to generate signals of a lower frequency than those produced by oscillator 16. However, due to the manner in which the two oscillators are coupled together through variable resistor 46, the tendency of oscillator 14 to shift in frequency causes a phase shift in the signals obtained at the plate electrodes 18 and 20 of oscillators 14 and 16. As before, this change in phase between the two signals from the oscillators causes a change in the potential applied to the primary winding 26 of the output transformer 28 through coupling condensers 30 and 32. The detector circuit 12 reacts to this change in primary winding voltage in the same manner as previously described. Hence, it can be seen that the operation of the circuit of this invention, when applied to an electronic fence protection system, is independent of an area to be protected.

In order to make the circuit of this invention less sensitive to changes in ambient conditions when operating as a fence supervisory system, it has been found to be convenient to provide automatic frequency control (AFC) signals to one of the oscillators 14 or 16. For example, in the event of rain or snow there is a tendency for the capacity to ground of the antenna to change very slowly. From the curve of FIGURE 2 it can be seen that this change of capacity for the same amount of fixed coupling causes a shift in the operating point, and hence a change in the voltage appearing across the meter 82 in FIGURE 1. Since this change is quite slow, the detector circuit 12 does not respond to it since it operates on the rate of change of the signals applied thereto. However, the slow change in capacity may possibly cause the operating point Q to move to a position where the two oscillators can no longer be held in frequency synchronization, i.e. the phase shift exceeds the permissible limits of ±90°.

The AFC voltage may be derived at the terminal 76 which is the output from the diode rectifier 62, and fed back through a reference device, here shown as a battery 175, to a frequency sensitive electrode of either oscillator tube 22 or 24. This AFC loop is dotted in FIGURE 1. For example, the AFC voltage may be fed back from junction 76 through reference device 175 to the suppressor grid of tube 22 so as to affect the transconductance of this tube. Since the frequency of oscillation is dependent on the transconductance of the tube 22, the result is that when the AFC voltage exceeds the reference voltage, the frequency of oscillator 14 tends to change with respect to the frequency of oscillator 16. This tendency to change, in turn, causes a change in the phase shift between the plate currents of the two oscillators such that the effect of the slow change in capacity is counteracted. It should be emphasized that this modification is not necessary in most applications since the basic circuit is quite stable in and of itself.

It is not an absolute requirement that the two oscillator circuits 14 and 16 be identical to provide the desired phase shift upon the ingress of an intruder. The system operates successively when one oscillator is made to oscillate at a fixed frequency, for example by providing a piezoelectric crystal for this purpose, and the other oscillator is not so controlled. It has been found that the energy coupling obtained through the use of a coupling resistor is capable of holding the unregulated oscillator in frequency synchronism with the crystal controlled oscillator. The effect of a slight change in energy coupling or in the tank circuit parameters of the unregulated oscillator is to produce a phase shift between the output signals of the two oscillators which causes a substantial voltage to be induced in the transformer secondary winding 60.

Another modification which may be made to the basic circuits of this invention is to replace the variable coupling resistor 46 with a lead sulfide cell or other suitable photoconductive element, such as photoconductive cell 46a of FIGURE 1a, such that the coupling between the two oscillators may be varied in response to variation in light intensities striking the cell. Again, oscillators 14 and 16 are made as nearly alike as possible and are normally operated so that they would oscillate at virtually the same frequency if the fixed coupling elements were not present. The coupling provided through the photoconductive coupling element, however, is adequate to cause the oscillators to synchronize, and within certain limits, the normal frequency of either oscillator can be changed and the two oscillators will still oscillate at the same frequency, even though the absolute value of the operating frequency might change somewhat. As the light striking the photoconductive cell is varied, a corresponding shift in phase angle between the signals obtained at the oscillator plate electrodes 18 and 20 also occurs and, as a result, a substantial voltage is developed across a primary winding 26 of output transformer 28 and applied to the detector circuit 12.

The coupled oscillator arrangement of this invention is also quite suitable in telemetering or servo control applications. FIGURE 5 illustrates schematically the manner in which this invention may be applied to indicate, at a remote location, the level of a liquid in a tank. In FIGURE 5 there is shown a tank 178 containing a substance 180 the level of which it is desired to monitor. Associated with tank 178 is a variable capacity pickup device 182, many forms of which are well known in the art. The pickup device is connected across terminals 34 and 36 of oscillator 14 and is effective to tend to vary the frequency of oscillator 14 in response to a change in the level of the substance in tank 178. The frequency determining portions of oscillators 14 and 16 are again coupled together through resistor 46 such that the oscillators tend to remain normally locked in perfect synchronism when the substance in tank 178 is at a desired level. In FIGURE 2, perfect sync is represented by the operating point Q being at the origin.

Referring still to FIGURE 2, when the system is in perfect synchronization and the capacity of the pickup device 182 is then either increased or decreased by the same amount, the magnitude of the output voltage will be substantially the same in each case since the curves are symmetrical. For this reason, suitable phase detecting circuitry is employed in place of the detector circuit 12 of FIGURE 1 to provide a means for determining the direction in which the change in capacity is occurring.

In FIGURE 5, the two oscillators are shown as being connected through coupling capacitors 30 and 32 to two separate input channels of a phase detector 184. The particular phase detector shown is old in the art and forms no part of the present invention as such. The transformer 186 is fed from oscillator 14 and feeds diode 188, having a resistor 190 and a shunt capacitor 192 connected in the anode circuit thereof. Transformer 194 which is fed from oscillator 16 has in series with its primary winding a condenser 196 which is inserted to impart a 90° phase shift in the voltage of transformer 194. The meter 198, which is in this case a zero center voltmeter, is connected to read the voltage drop between the lower points of resistors 190 and 200.

Both diodes 188 and 202 are arranged to operate as linear or peak rectifiers as is well known in the art, and if the transformers 186, 194 and 204 are all one-to-one transformers and the voltages are in phase, then the voltages in the secondaries of transformers 194 and 204 are 90° out of phase and the voltage drops through resistors 190 and 200 are equal and the meter will read zero.

Now, when the substance in container 178 tends to increase in level, a change in capacity (say an increase) is detected by the pickup element 182 and applied to the tank circuit of oscillator 14. The frequency of oscillator 14 therefore tends to decrease, but because of the coupling between the two oscillators as provided through resistor 46, an energy transfer takes place tending to hold the two oscillators in frequency synchronism. The net result is a shift between the signals appearing at the outputs of the two oscillators. If, now, the voltage from oscillator 16 begins to lead the voltage from oscillator 14, the voltage drop across resistor 200 will increase and the meter 198 will read in one direction. This reading will increase to a maximum for a 90° lead.

If the level of the substance in tank 178 falls from its normal level, the capacity applied to the tank circuit of oscillator 14 decreases. As a result, the voltage from oscillator 16 begins to lag the voltage from oscillator 14 such that the voltage drop across resistor 200 decreases causing the meter 198 to read in the other direction and will increase to a maximum for a 90° lag.

By a calibrating meter 198 in units of depth instead of voltage or phase angle, it is possible to obtain a measure of the departure of the level in the tank from a normal level, directly. In a servo system, the meter may be replaced with a suitable driving means to control a valve which in turn controls the level of the substance in the tank so as to maintain the level constant.

By way of example only, since the choice of tubes and values of condensers and resistors as well as supply voltage are not critical, the values and components shown in Table 1 may be used in constructing the circuit of FIGURE 1.

*Table 1*

| | |
|---|---|
| Frequency of oscillation | 400 c.p.s. |
| Voltage supply for plates | 150 v. regulated. |
| Tube 22 | 6AB7. |
| Tube 24 | 6AB7. |
| Tube 70 | 6SL7. |
| Tube 98 | 6SL7. |
| Tube 126 | 6SN7. |
| Tube 128 | 6SN7. |
| Diode 80 | Sylvania type IN38B. |
| R140 | 1M ohm. |
| R142 | 1M ohm. |
| R152 | 10K ohms. |
| R162 | 18K ohms. |
| R164 | 18K ohms. |
| R170 | 0 to 10K ohms. |
| C9 | .2 microfarad. |
| C11 | .1 microfarad. |
| C13 | 10 microfarads. |
| R1 | 50K ohms. |
| R3 | 100K ohms. |
| R5 | 60K ohms. |
| R7 | 500 ohms. |
| R46 | 5K ohms. |
| R64 | 0.5M ohms. |
| R92 | 10M ohms. |
| R104 | 0.5M ohms. |
| R110 | 10M ohms. |
| C30 | 0.5 microfarad. |
| C32 | 0.5 microfarad. |
| C66 | 15 microfarads. |
| C84 | 0.5 microfarad. |
| C90 | 5 microfarads. |
| C108 | 1 microfarad. |
| C100 | 1 microfarad. |
| C132 | 0.15 microfarad. |
| C134 | 0.15 microfarad. |

When more than one system is operated in a given area, or in adjacent zones, there is often enough exchange of energy between the systems to cause beat frequencies to arise and thus false alarms. In my invention I have found that if all the systems are synchronized to operate at exactly the same frequency the problem is eliminated. In FIGURE 6 a master oscillator 210 has a pair of output lines 211 and 212 which feed a signal from the master oscillator to the system located in each zone to be protected. A junction 213 on the conductor 212 is connected to the ground conductor of the oscillator-amplifier 14'. Oscillator-amplifier 14' may be of the same type as oscillator 14 of FIGURE 1. In the feedback loop of oscillator-amplifier 14' a switch 214 is installed in order to connect the input from the master oscillator to be connected from conductor 211 at a junction 215 through the switch 214 and capacitor 9 to the grid of tube 22. The tube 22 and circuit then operate basically as an amplifier of the master oscillator signal and radiates energy from loudspeaker 42. Coupling between oscillator-amplifier 14' and oscillator 16 is maintained, as in FIGURE 1, by means of the acoustic energy coupling between speakers 42 and 44 and also by means of resistor 46. With the switch 214 in the "Osc" position, the detection system operation is identical with FIGURE 1. With the switch 214 in the "Amp" position, the oscillator is changed to an amplifier and changes in the energy transfer affect only the relative phase of the remaining oscillator 16. In other words the phase of the master lines 211 and 212 is affected little or nothing while the oscillator 16 is free to vary its phase, with respect to the master oscillator, with changes in energy transfer. The phase detecting circuit connected to capacitors 30 and 32 is the same as shown in FIGURE 1 and operates in the same way. Additional zone systems identical with that described are maintained at the same frequency since the master lines 211 and 212 is connected to the oscillator-amplifier 14' of each such additional zone.

FIGURE 7 is a modification of FIGURE 6 and discloses a master oscillator and control power amplifier 220 feeding a master line 221 to a number of zones. The master line 221 feeds the loudspeakers 42 directly rather than through amplifier 14 as in FIGURE 6. Crosscoupling still exists from speakers 42 to the frequency determining circuit of oscillator 16 and loudspeakers 44. An impedance matching transfermer 222 couples a portion of the master oscillator signal into the phase detector 12 in the same manner as previously described in regard to oscillator 14 of FIGURE 1. Each of the other zones have the same equipment as zone 1.

It has been pointed out above that the intruder detection system operates successfully when one oscillator is made to oscillate at a fixed frequency and the relative phase of the free running oscillator is varied as a function of the movement of the intruder. Only one of the oscillators has connected to it an intruder sensor, for example, only one loudspeaker need be used in such a system. This embodiment of the intruder detection system is shown in more detail in FIGURE 8.

Referring now to the oscillatory section 10 of the circuit of FIGURE 8, there is disclosed two substantially identical oscillators 14" and 16" which are initially set to oscillate at substantially the same frequency, for example, 460 cycles per second. The oscillator circuitry is somewhat different than that disclosed in FIGURE 1 and will be described. It will be understood, however, that the oscillators of FIGURE 1 could also be used in the embodiment of FIGURE 8. The oscillatory circuits 14" and 16", respectively, may utilize conventional triode emplifying tubes 22' and 24'. The plate electrode 18 is connected through the primary winding of a transformer 230 to the B+ source. Similarly, the plate electrode 20 is connected through the primary winding of a transformer 231 to the B+ source. Regenerative feedback to the grid of oscillator tube 22' is provided from the secondary winding of transformer 230 through a conductor 232 and a coupling capacitor 233. Regenerative feedback is provided to the grid of the oscillator tube 24' from the secondary winding of transformer 231 through a conductor 234, a terminal 235, a removable jumper 236, a terminal 237, and coupling capacitor 240. The jumper 236 may be removed to connect oscillator 16" to an amplifier, as will be described below. The plate electrode 18 is also coupled through an isolating capacitor to a tuned circuit 241, and similarly the plate electrode 20 is coupled through an isolating capacitor to a tuned circuit 242.

The output signals from the oscillators are obtained at the plate electrodes 18 and 20 of the oscillator tubes 22' and 24', respectively. The secondary winding of transformer 230 is connected to the pair of terminals 34 and 36, and the secondary winding of transformer 231 is connected to the pair of terminals 38 and 40. The terminals 34 and 36 are connected through an impedance matching transformer to suitable condition responsive transducer means 42, here shown as a loudspeaker. The terminals 38 and 40 are shunted by an impedance 243. The adjustable impedance 46' which is connected between conductors 232 and 234 provides the required coupling between the two oscillator circuits 14" and 16" to maintain the oscillators synchronized in frequency.

The tuned circuits 241 and 242 of the two oscillators are also connected to the fixed contacts, respectively, of a single pole double-throw oscillator selector switch 248. The pole of the switch is connected to one terminal of an adjustable capacitor 249, the other terminal being grounded. The capacitor 249 is a phase adjusting capacitor and operates as a trimmer capacitor in the tuned circuit of the oscillator selected by the position of selector switch 248.

The difference in phase angle between the outputs of the two oscillators are compared by the phase detector 12. A junction 250 between the tuned circuit 241 and the isolating capacitor is connected through a resistor 251 to an input terminal 252 of the phase detector circuit. A junction 253 between the tuned circuit 242 and the isolating capacitor is connected by means of the resistor 254 to the other input terminal 255 of the phase detector. Connected across the terminals 252 and 255 is a resonant circuit comprising in parallel a capacitor 256 and an inductance 257, the center tap of which is grounded. This LC circuit is designed to be resonant at the frequency of oscillation of the oscillators 10 which has been described as 460 c.p.s. The terminals 252 and 255 are further connected through a pair of detector rectifiers to a filter network 260. This network is effective to eliminate the 460 c.p.s. component and pass the low frequency A.C. component due to motion of the intruder. The low frequency A.C. output signal of the filter network 260 is fed through a capacitor 261, which eliminates the effect of the steady state or static D.C. component in the filter and which also blocks out any long term voltage drift or variations such as ambient temperature effects, to the grid of a twin triode amplifier tube 262.

The twin triode 262 is connected as a cathode follower stage followed by a grounded grid amplifier stage. The two stages have a common cathode resistor. A high frequency bypass capacitor is connected in the plate circuit of the grounded grid stage. The low frequency A.C. output signal from the amplifier 262 is fed through a coupling capacitor 263 to a sensitivity potentiometer 264, the adjustable wiper of which is directly connected to the grid of a twin triode limiter stage 265. This tube 265 is also connected with the first triode operating as a cathode follower and the second triode in the grounded grid configuration. A relatively large common cathode resistance is connected in the cathode circuit of the two stages to make the limiter operate as a high impedance device which does not draw any grid current. A bypass capacitor is connected in the plate circuit of the grounded grid stage.

The output signal from the tube 265 is connected through an isolating capacitor 266 and a potentiometer 267 to a conventional single-tube phase-splitter 270 in which the load resistor is divided into two parts 271 and 272, the resistor 271 being connected to the plate in the normal way and the portion 272 being connected between cathode and ground. The two outputs from the phase splitter 270 are fed through a pair of isolating capacitors 273 and 274, and through a pair of detector rectifying diodes and a resistor to charge a relatively large capacitor 274. The grid and cathode electrodes of a final amplifier triode tube 275 are connected across the capacitor 274 and the alarm relay 276 is connected in the plate circuit of the tube 275. A resistor is connected in parallel with the capacitor 274 and is chosen sufficiently large that the time constant for discharging the capacitor 274 is long as compared with the charging time from the final detector circuit.

In considering the operation of the embodiment of FIGURE 8, the substantially identical oscillators 14" and 16" are initially set to oscillate at substantially the same frequency. The two oscillators have energy intercoupling through the resistance 46', which may be an adjustable resistance, for the purpose of maintaining the oscillators in frequency synchronism throughout the range of operation of the system. The above discussion concerning the relation of the curves of FIGURE 2 with respect to the magnitude of the intercoupling resistance is equally applicable to the oscillators of FIGURE 8. A large value of intercoupling resistance 46' provides a loose coupling and a smaller value of resistance provides a tighter coupling.

The quiescent phase displacement between the two oscillators 14" and 16" may be adjusted by the variable capacitor 249. By the position of the oscillator selector switch 248, the trimmer capacitor 249 may be connected into the tuned circuit of either oscillator 14" or oscillator 16". Let it be assumed for explanatory purposes that the trimmer capacitor 249 and coupling resistor 46' are adjusted such that the static phase displacement between the synchronized oscillators 14" and 16" is 45°. The phase detector produces an output voltage which increases relatively linearly in magnitude as the phase displacement between the oscillators increases from zero degrees towards 90°, and therefore at 45° displacement the output from the phase detector into the filter 260 results in a D.C. potential at blocking capacitor 261 which is approximately one half of the potential which would result from a 90° displacement. As long as the two oscillators remain out of phase by a constant 45°, as is the case when no intruder is present, the potential at blocking capacitor 261 remains constant and no signal is transmitted to amplifier 262.

As has been described, the oscillator 14" has connected to its terminals 34 and 36 a loudspeaker. The loudspeaker reflects a certain quiescent resistance or impedance into the oscillator tuning circuit dependent upon the quiescent acoustic load the loudspeaker sees. Motion of an intruder causes a changing acoustic load to be seen by the loudspeaker, which in turn reflects a changing impedance into the oscillator tuning circuit. The tuning of the oscillator is thus affected and a changing phase displacement between the two oscillators results. The movement rate of an intruder may be in the range which produces phase shifts between the two oscillators having a frequency component of from .1 to 20 c.p.s. and the low pass filter 260 is designed to pass these low frequency A.C. components and block the 460 c.p.s. frequencies. The blocking capacitor 261 attenuates frequencies below approximately .1 c.p.s.

The sensitivity of the system comprising amplifier 262, limiter 265, phase splitter 270 and power amplifier 275 is such that minor excursions in phase angle caused by the motion of an intruder are effective to operate the alarm relay 276. As an example, the sensitivity potentiometer may be adjusted so that if the phase angle between the output signals of the two oscillators varies between 44.9° and 45.1°, due to the ingress of an intruder, the alarm will be operated. The rate at which the phase angle varies is determined in part by the rate at which the intruder moves. The magnitude of the phase excursions from the quiescent 45° is determined by the size of the intruder, the position of the intruder in the space being protected, the type of clothing worn, and the like.

Although for explanatory purposes the quiescent phase displacement between the two oscillators has been chosen at 45°, any other suitable phase displacement may be used. With another type of phase detector it may be more desirable to maintain the oscillators both synchronized and in phase under static conditions.

In the system described in FIGURE 8, it is feasible to have a plurality of speakers 42 connected in parallel with one another at terminals 34 and 36 of oscillator 14". These paralleled speakers may be grouped and phased to improve the pattern of the beam of energy; they may be placed in different parts of an enclosure to increase the area of protection; or they may be placed in various locations which are isolated from each other. An intruder in the range of any of these paralleled speakers is reflected back to oscillator 14" to cause an alarm.

A modification of FIGURE 8, which is shown in FIGURE 10, is to place speaker 42 in one area (Room 1) to be protected and to replace resistor 243 with speaker 44 on oscillator 16"; the speaker 44 being placed to protect an area (Room 2) remote from speaker 42 such that an intruder entering the area protected by speaker 44 affects primarily speaker 44 and oscillator 16" and causes a phase shift to occur between the oscillators and the alarm to be operated. Similarly if the area protected by speaker 42 is entered by an intruder, the speaker 42 reflects the varying acoustic load to oscillator 14" and the alarm is sounded. Each speaker operates substantially independently of the other in this mode of operation, and while speaker 44 senses the ingress of an intruder thus presenting a varying impedance to oscillator 16", the speaker 42 may be presenting a constant steady state impedance to oscillator 14" and vice versa.

When more than one system of the preferred type disclosed in FIGURE 8 is operated in a given area, or in adjacent areas, they may be connected as shown in FIGURE 9. When two or more independent systems are located sufficiently near one another that they hear each other, very small frequency differences cause beat frequencies which may result in false alarm. In FIGURE 9 the master oscillator and power amplifier 220 feed through a master line to a number of zones to make all the zones operate on exactly the same frequency.

In the installation of the system, the oscillator unit 16" is modified in the configuration shown in FIGURE 9 in that the removable jumper 236 (FIGURE 8) is removed, the output of the master oscillator is connected through the isolating resistor 239 to terminal 237 and the tube 24' together with the circuit then operates basically as a buffer amplifier of the master oscillator signal. The master frequency is injected into the newly created amplifier at the same intensity that existed when it functioned as an oscillator. Coupling between the amplifier 16" and the oscillator 14" is maintained by the intercoupling resistor 46'. The oscillator 14" has connected to its condition responsive terminals the loudspeaker 42 so that the phase displacement between oscillator 14" and amplifier 16" will vary upon the ingress of an intruder in the same manner described above for the circuit of FIGURE 8. The amplifier 16" is fed by the master oscillator, and its phase is fixed, while the phase of oscillator 14" is free to vary.

The phase detecting circuitry is identical with that described for the circuit of FIGURE 8 and operates in an identical manner.

A modification of FIGURE 9, which may be preferable under certain conditions, is to eliminate the amplifier 16" with its load 243. Under these conditions the intercoupling resistance 46' would be coupled to the master line instead of to terminal 234, and the resistor 254 would also be coupled to the master line instead of to the junction 253. This makes the system more nearly similar to that shown in FIGURE 7 except that the disclosure of FIGURE 7 shows loudspeakers operated from the master oscillator amplifier 220. These speakers 42 which were disclosed in FIGURE 7 and which were driven directly from the master oscillator amplifier are eliminated. The alarm system thus is responsive to the condition sensing speaker connected to the oscillator 14".

Although I have illustrated and described herein certain specific embodiments of my invention I am fully aware that many other modifications and applications may be made and I do not intend to be limited except insofar as necessitated by prior art and as indicated by the following claims.

I claim as my invention:

1. In an intruder detection system: a pair of oscillator circuits each having frequency determining portions set to yield oscillations at substantially the same amplitude and frequency, one oscillator circuit being slightly detuned from the other in frequency; intruder responsive synchronizing means intercoupling the frequency determining portions of said circuits for maintaining said oscillations locked in synchronism throughout the range of operation of the system, said synchronizing means being condition responsive upon the ingress of an intruder within the effective range of the system which tends to change the degree of intercoupling between said circuits; means separate from said intercoupling means connected to said circuits for deriving signals proportional to the change in intercoupling resulting from the ingress of said intruder; and alarm means responsive to a predetermined level of said derived signal for providing a perceptible indication.

2. In a condition responsive system, the combination comprising: at least two oscillators set to produce oscillations at substantially identical frequencies, one oscillator being slightly detuned from the other in frequency; loudspeaker synchronizing means connected to the tank circuits of each of said oscillators each radiating and receiving said oscillations to effect a synchronizing energy transfer between said circuits so that said oscillators remain locked in frequency synchronism throughout the limits of operation of the system upon the introduction of a condition tending to disturb said energy transfer; and detector means connected between said oscillators for deriving signals proportional to the change in phase relationship between said oscillations resulting from the introduction of said condition.

3. A light responsive system comprising: a pair of oscillator circuits each having frequency determining portions set to oscillate at substantially identical frequencies, one oscillator circuit being slightly detuned from the other in frequency; photoconductive impedance means for synchronizing said oscillators intercoupling the frequency determining portions of said circuits such that said oscillators are forced to operate locked in frequency synchronism throughout the range of operation of the system and such that said oscillations are displaced in phase by a predetermined amount due to said detuning; detector means connected between said circuits for producing an indication proportional to the change in phase displacement between said oscillators upon the introduction of a condition tending to change the radiation normally impinging on said photoconductive means.

4. In a condition responsive system, the combination comprising: at least two oscillator circuits each having frequency determining portions initially tuned to produce oscillations at substantially identical frequencies and displaced in phase by a predetermined angle; impedance means connected between the frequency determining portions of said circuits for providing a predetermined amount of energy transfer between said circuits; loudspeaker transducer means coupled to each of said frequency determining portions to effect a further energy transfer between said circuits such that said circuits remain locked in frequency synchronism upon the introduction of a condition tending to alter the energy transferred between said loudspeaker means; means connected between the output terminals of said oscillator circuits for deriving signals proportional to the change in phase from said predetermined angle resulting from the introduction of said condition; and means connected to said signal deriving means for actuating indicator means.

5. In a condition responsive system, the combination comprising: master oscillator means; a plurality of secondary oscillators each of which is set to produce oscillations at substantially the frequency of said master oscillator means but slightly detuned therefrom; first loudspeaker means energized by said master oscillator means; loudspeaker type synchronizing means connected to the frequency determining portions of each of said secondary oscillators each radiating and receiving oscillations to effect a synchronizing energy transfer between said master oscillator and said secondary oscillators so that said oscillators remain locked in frequency synchronism throughout the limits of operation of the system upon the introduction of a condition tending to disturb said energy transfer; and detector means connected between said master oscillator and said secondary oscillators for deriving signals proportional to the change in phase relationship between said master oscillator and said secondary oscillators resulting from the introduction of said condition.

6. In intruder detection apparatus a plurality of detection systems comprising: master oscillator means having an output for each of a plurality of detection systems; a plurality of secondary oscillator circuits, at least one being associated with each of said systems and each having frequency determining portions set to yield oscillations at substantially the same frequency of said master oscillator means but slightly detuned therefrom; means including condition responsive synchronizing means intercoupling said master oscillator means outputs and the frequency determining portions of said plurality of oscillator circuits for maintaining said oscillators locked in synchronism throughout the range of operation of the system, said synchronizing means being condition responsive upon the ingress of an intruder within the effective range of the system which tends to change the degree of intercoupling between said oscillators; and means separate from said intercoupling means connected to said oscillators for deriving signals proportional to the change in intercoupling resulting from the ingress of said intruder.

7. In condition responsive apparatus a plurality of condition responsive systems comprising: master oscillator means having an output for each of a plurality of condition responsive systems; a plurality of secondary oscillators, at least one being associated with each of said systems and each of which is set to produce oscillations at substantially the frequency of said master oscillator means but slightly detuned therefrom; first loudspeaker type means in each of said systems energized by said master oscillator means outputs; synchronizing means comprising loudspeaker type means coupled to the frequency determining portions of each of said secondary oscillators, each radiating and receiving oscillations to effect a synchronizing energy transfer between said master oscillator output and said secondary oscillators so that said oscillators remain locked in frequency synchronism throughout the limits of operation of the system upon the introduction of a condition tending to disturb said energy transfer; and detector means connected between said master oscillator and said secondary oscillators for deriving signals proportional to the change in phase relationship between said master oscillator and said secondary oscillators resulting from the introduction of said condition.

References Cited by the Examiner

UNITED STATES PATENTS

| 1,717,630 | 6/1929 | Schaffer | 340—261 |
| 2,329,811 | 9/1943 | Zushlag | 331—64 X |
| 2,594,424 | 4/1952 | Gordon | 331—65 X |
| 2,646,559 | 7/1953 | Nutzler | 340—258 |

FOREIGN PATENTS 719,179   11/1954   Great Britain.

OTHER REFERENCES

Electrical Measurements by Electrical Methods, Roberts (1946), pp. 18–21 (copy available in Group 230), TK 275.R6.

NEIL C. READ, *Primary Examiner.*

R. M. GOLDMAN, *Assistant Examiner.*